UNITED STATES PATENT OFFICE.

TIMOTHY DOLAN, OF MILWAUKEE, WISCONSIN.

LEAK-STOPPING COMPOSITION FOR RADIATORS AND THE LIKE.

1,413,524.  Specification of Letters Patent.  Patented Apr. 18, 1922.

No Drawing.  Application filed November 12, 1921. Serial No. 514,789.

*To all whom it may concern:*

Be it known that I, TIMOTHY DOLAN, a citizen of the United States of America, residing at Milwaukee, in the county of Milwaukee and State of Wisconsin, have invented certain new and useful Improvements in Leak-Stopping Compositions for Radiators and the like, of which the following is a specification.

The primary object of the invention is the provision of a mixture for radiators adapted not only for stopping leaks therein but also removing all rust, alkali and other sediment.

A further object of the invention is to primarily provide a radiator mixture for stopping leaks and also serviceable in other metal containers for removing rust, alkali and the like without injuring the metal, the mixture serving to fill up cracks and leaks in the surface thereof.

The use of meal and powders for the stoppage of leaks in radiators is well known but my invention provides the admixture of ingredients into solution for employing the solution in the water of the radiator.

Broadly considered, I provide the following ingredients thoroughly co-mingled by agitation as well as boiling to make a strictly chemical mixture; Irish moss, red oak bark, lye, tannic acid, graphite, cutch, gum guiac, soda ash and water.

The Irish moss is a chondrus crispus, yielding a soluble gum while the red oak bark is rich in tannin. The tannic acid is a digallic acid, while the ordinary graphite is employed which commonly serves as a base in paint mixture. Cutch is sometimes termed catechuc (terra japonica) and the properties of the remaining ingredients are well known.

In compounding these nine ingredients, the following proportions have been found advantageous, the qualities for purposes of illustration being based upon a total batch of fifty-six pounds:

One pound of graphite; two pounds each of tannic acid and gum guiac; four pounds each of Irish moss, lye, cutch and soda ash; ten pounds of red oak bark; and twenty-five pounds of water, $H_2O$.

The ingredients in these specific proportions being agitated and boiled provide a radiator mixture that is ready for use. The manner of using the same preferably is to employ one teaspoonful of the mixture to seven gallons of water. The water for filling the radiator is preferably first supplied with the mixture in proportions substantially equal to one teaspoonful of the mixture for seven gallons of water and then poured into the radiator where it may remain indefinitely or at least held in the radiator for forty-eight hours when leaks and cracks will be filled, and all rust, alkali and other sediments will have disappeared. The mixture may again be employed should any further leak appear. The proportions as noted are preferable and the invention relates thereto although slight variations might be made therein without departing from the spirit and scope of the invention.

What I claim is:—

1. A radiator mixture including Irish moss, red oak bark, lye, tannic acid, graphite, cutch, gum guiac, soda ash and water.

2. A radiator mixture including graphite, twice as much tannic acid and gum guiac as graphite; twice as much Irish moss, lye, cutch, soda ash as tannic acid and gum guiac; as much red oak bark as there is of Irish moss, lye, and tannic acid combined, and as much water as there is red oak bark, cutch, soda ash, gum guiac, graphite and lye combined.

3. A radiator mixture comprising graphite; tannic acid, and gum guiac in greater quantity than the graphite; Irish moss, lye, cutch, and soda ash in greater quantity than tannic acid and gum guiac; red oak bark in greater quantity than any two of the other ingredients and a quantity of water greater than the combined weight of any four of the above ingredients.

In testimony whereof I affix my signature.

TIMOTHY DOLAN.